United States Patent [19]

Odell

[11] Patent Number: 5,354,991

[45] Date of Patent: Oct. 11, 1994

[54] APPARATUS AND METHOD FOR DETECTING FULL-CAPTURE RADIATION EVENTS

[75] Inventor: Daniel M. C. Odell, Aiken, S.C.

[73] Assignee: The United States of America as represented by the Unites States Department of Energy, Washington, D.C.

[21] Appl. No.: 24,553

[22] Filed: Mar. 1, 1993

[51] Int. Cl.⁵ .................... G01T 1/161; G01T 1/20
[52] U.S. Cl. ...................... 250/369; 250/363.07
[58] Field of Search ................... 250/369, 363.07

[56] References Cited

U.S. PATENT DOCUMENTS

| H12 | 1/1986 | Bennett et al. | 250/369 |
|---|---|---|---|
| 4,212,061 | 7/1980 | Knoll et al. | |
| 4,258,428 | 3/1981 | Woronowicz | 250/369 |
| 4,316,257 | 2/1982 | Del Medico et al. | |
| 4,521,688 | 6/1985 | Yin | 250/369 |
| 4,899,054 | 2/1990 | Barfod | 250/369 |
| 5,115,394 | 5/1992 | Walters | 378/4 |
| 5,144,141 | 9/1992 | Rougeot et al. | 250/369 |

Primary Examiner—Paul M. Dzierzynski
Assistant Examiner—Drew A. Dunn
Attorney, Agent, or Firm—Brian R. Tumm; Harold M. Dixon; William R. Moser

[57] ABSTRACT

An apparatus and method for sampling the output signal of a radiation detector and distinguishing full-capture radiation events from Compton scattering events. The output signal of a radiation detector is continuously sampled. The samples are converted to digital values and input to a discriminator where samples that are representative of events are identified. The discriminator transfers only event samples, that is, samples representing full-capture events and Compton events, to a signal processor where the samples are saved in a three-dimensional count matrix with time (from the time of onset of the pulse) on the first axis, sample pulse current amplitude on the second axis, and number of samples on the third axis. The stored data are analyzed to separate the Compton events from full-capture events, and the energy of the full-capture events is determined without having determined the energies of any of the individual radiation detector events.

20 Claims, 2 Drawing Sheets

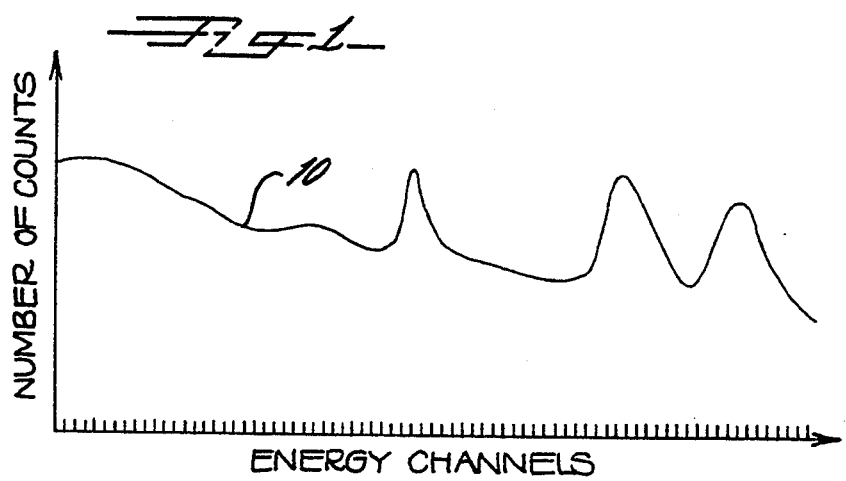
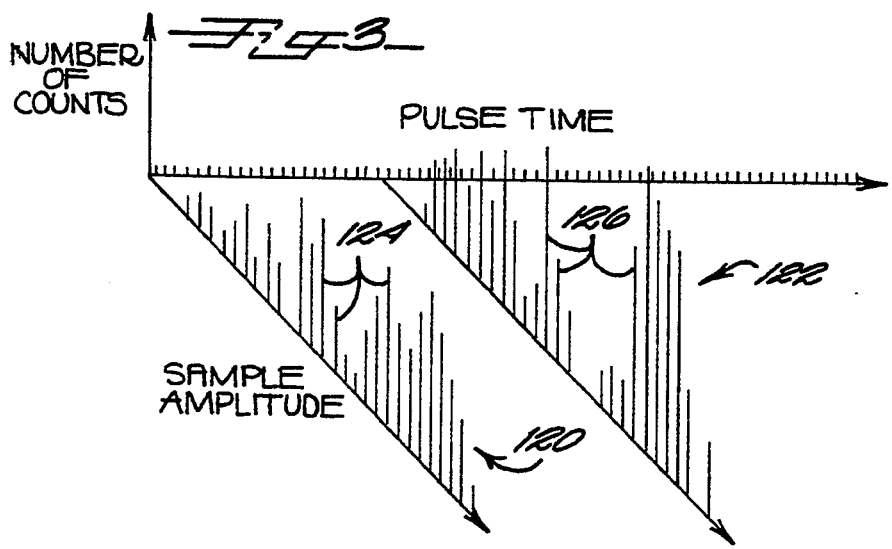
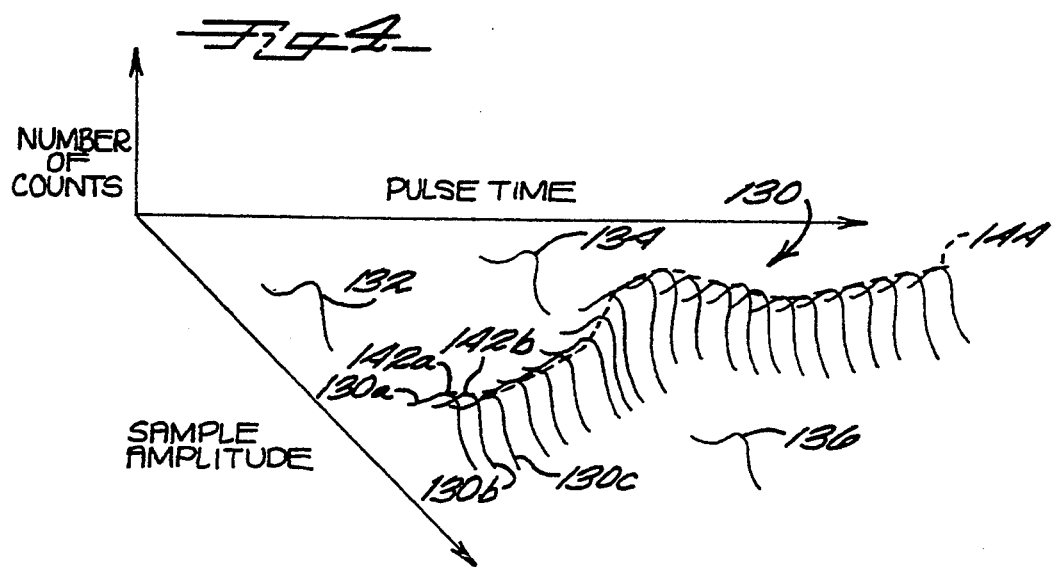

APPARATUS AND METHOD FOR DETECTING FULL-CAPTURE RADIATION EVENTS

The United States Government has rights in this invention pursuant to Contract No. DE-AC09-89SR18035 between the U.S. Department of Energy and Westinghouse Savannah River Company.

BACKGROUND OF THE INVENTION

1. Field of the Invention:

The present invention relates to identification and quantification of radionuclides using a radiation detector. In particular, the present invention relates to an apparatus and method for sampling the output signals of a radiation detector and distinguishing signals representing full-capture events from those representing Compton scattering events.

2. Discussion of Background:

Conventional radiation spectroscopy techniques are based on the interaction of ionizing radiation with the atoms of a suitable detector. As the radiated particle loses energy in each interaction, it deposits an excess electrical charge in the detector. If all of the charge so deposited were collected (as by integration by a capacitor), then the energy of the incoming particle can be determined. Therefore, present-day instruments attempt to optimize charge collection, i.e. to collect all the excess electrical charge.

The energy of the ionizing radiation particle is a clue to the identity of the source of the particle. A given source may produce, through radioactive decay, particles having one or more energy levels characteristic of that source. To determine the energy spectrum of the incoming particles, the energy produced by each interaction—or event—in the detector is measured, and the number of events that occur having an energy in each energy range are counted and plotted versus energy. FIG. 1 shows a sample spectrum 10. This two-dimensional method of viewing the data is the method used with current instrumentation.

Because events occur to some extent randomly and several events may occur almost simultaneously, collecting, sorting and analyzing the event data can pose an electronic obstacle. Many devices and techniques are available for obtaining event data from detectors. Data-collection systems are typically "event-triggered," that is, the system is enabled when the detector output exceeds a predetermined threshold value. Data collection continues until the detector output falls below the threshold value, whereupon the system is returned to its normal or "non-event" state.

"Dead-time" limitations are inherent in event-triggered systems: once the system is triggered by the start of an event, it cannot collect or process subsequent events until the system has returned to its normal or "non-event" state. Therefore, event-triggered systems have limited ability to distinguish between separate, nearly simultaneous events. When an event enables the system, a later event may begin before the first event is completed and before the system can return to its normal state. Thus, the system will not resolve the signals of the two separate events; the two events will be treated as a single, continuous event of extended duration.

A method and apparatus for reducing dead-time are described in commonly-assigned U.S. patent application Ser. No. 08/014,916, filed Feb. 8, 1993; ("Method and Apparatus For Data Sampling"). In this application, the detector output is continuously sampled at a high rate. When no event is occurring, the sampled data represent only "non-events" including noise. When an event is occurring, the data represent "events," that is, the interaction of particles with the detector. The sampled data are encoded as binary numbers, or "digitized," and processed to identify those samples that are representative of detected events. The use of continual, high-speed digital sampling reduces both deadtime and also other problems associated with analog data-collection techniques, such as drift.

But nether the traditional, event-triggered method nor that disclosed in application Ser. No. 08/014,916 ("Method and Apparatus For Data Sampling"), can distinguish "full-capture" events, where all the energy of an incoming particle is deposited in the detector, from "partial-capture" or Compton scattering events of the same energy, where only some of the particle's energy is deposited in the detector. When integrated in the traditional manner or according to the technique described above, a Compton event is indistinguishable from a full-capture event of the same energy. Thus, Compton scattering events often obscure full-capture events of comparable energy, leading to inaccuracies in data analysis and evaluation.

Several techniques are available for correcting spatial information in radiation imaging systems such as gamma cameras and scintillation cameras. Barfod (U.S. Pat. No. 4,899,054) reduces the sensitivity for some locations on the detector of a gamma camera system to compensate for inherent non-uniformities in the system. Del Medico, et al. (U.S. Pat. No. 4,316,257) and Knoll, et al. (U.S. Pat. No. 4,212,061) use stored spatial distortion correction factors to correct for distortion effects in scintillation cameras. These spatial-discrimination techniques are not capable of correcting time-based data, including distinguishing Compton scattering from other detector events.

In U.S. Pat. No. 4,258,428, Woronowicz discloses a gamma camera having a Compton scattered radiation de-emphasizer. Scintillation events are displayed at the (x,y) coordinates of the event on a cathode ray tube screen by unblanking the tube with z pulses applied to its control electrode. The de-emphasizer sends small z pulses into the part of the spectrum where Compton scattering is most prevalent and increasingly larger z pulses where Compton scattering is insignificant. The system produces only a qualitative display, using predetermined, empirical correction factors. But individual Compton events as such are not distinguished from full-capture events by his system. Some multiple-detector systems use time coincidence to distinguish Compton events from full-capture events. However, no presently-available single-detector system can distinguish full-capture events from Compton scattering events.

SUMMARY OF THE INVENTION

According to its major aspects and broadly stated, the present invention is an apparatus and method for sampling the output of a radiation detector and processing the data to distinguish full-capture radiation events from Compton scattering events. The output signal of a radiation detector is continuously sampled. The magnitudes of the samples are converted to digital values and sent to a discriminator, where samples are identified as being representative of detected events (full-capture events and Compton events) or non-events (noise). The discriminator transfers only event samples to a signal processor where they are stored in a three-dimensional matrix with time (measured from the time of onset of each event) on the first axis, sample amplitude (representing the amplitude of the detector output current at each sampling time) on the second axis, and the number of samples on the third axis. The event samples are plotted to produce a three-dimensional image or "landscape," having well-defined series of peaks that correspond to full-capture events and randomly-dispersed peaks that represent Compton events. After the Compton events are eliminated, a curve is fitted to the maxima of each set of peaks and the area under each curve is determined. For each set of peaks, this area is proportional to the energy of the detector events that produced the peaks. Thus, the energies of the peaks are determined without having determined the energies of any of the individual detector events.

An important feature of the present invention is the sampling of the detector output. The higher the sampling rate, the more representative the discrete samples are of the detector output signal. The sampling rate is preferably at or above the Nyquist criteria for the event pulses being sampled, so the samples are sufficiently representative of the detector output to provide the information needed for analysis. Importantly, the output is only sampled, however often, but no attempt is made to accumulate all the output.

High speed digitizing or encoding in binary form is another, important feature of the present invention. All the samples are converted to digital representation immediately by one or more high speed analog-to-digital converters. Immediate digitizing makes subsequent processing easier and faster, and reduces the number of analog stages which are more prone to drift. Conventional systems convert to digital after determining which output corresponds to an event.

Another important feature of the present invention is the selection and transfer of event data for analysis. By generating the three dimensional plot of current amplitude, time and counts, Compton events can be readily distinguished from full-capture events and eliminated, leaving only the latter for analysis.

Other features and advantages of the present invention will be apparent to those skilled in the art from a careful reading of the Detailed Description of a Preferred Embodiment presented below and accompanied by the drawings.

BRIEF DESCRIPTION OF THE DRAWINGS

In the drawings,

FIG. 1 is a graphical view of a sample waveform obtained with prior art, event-triggered systems;

FIG. 3 is a graphical view of a series of samples obtained with the sampling and detection system of FIG. 2; and FIG. 4 is a graphical view of a series of samples, showing waveforms associated with full-capture events and Compton scattering events.

DETAILED DESCRIPTION OF A PREFERRED EMBODIMENT

Figure 2:
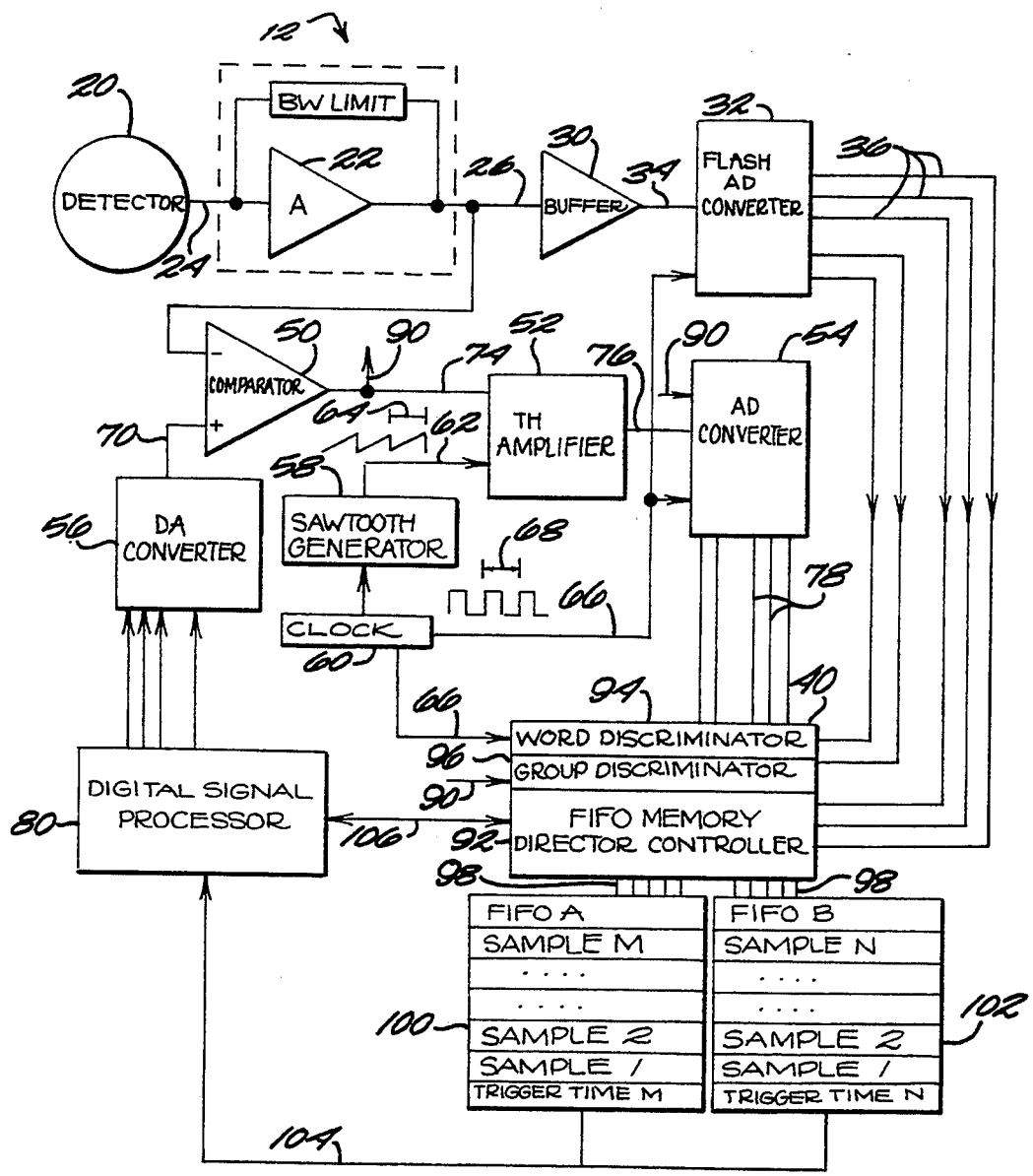
FIG. 2 is a schematic view of an apparatus according to a preferred embodiment of the present invention.

The present invention is an apparatus and method for sampling the output of a radiation detector and processing the data to distinguish full-capture radiation events from, for example, those representing Compton scattering events. The output signal of a radiation detector is continuously sampled and a digital discriminator identifies those samples that are representative of detected events. The discriminator transfers only event samples, that is, samples representing full-capture events and Compton events, to a signal processor for storage and analysis. The stored data are analyzed to separate out the Compton events from full-capture events, and the energy of the full-capture events is determined.

The method is implemented as follows:

1. The detector output signal is continuously sampled at a high rate, preferably at or above the Nyquist criteria for the event pulses being sampled. The higher the sampling rate, the more representative the discrete samples are of the detector output signal. However, as long as the sampling rate meets or exceeds the Nyquist criteria, the samples will be sufficiently representative of the detector output to provide the information needed for analysis.

2. The samples are sent to a discriminator, where samples are identified as being representative of detected events (full-capture events and Compton events) or non-events (noise). The discriminator sorts them and transfers only event samples to a signal processor for storage and analysis.

3. Samples representing a succession of events occurring during operation of the detector are stored in a three-dimensional matrix with time (measured from the time of onset of each event) on the first axis, sample amplitude (representing the amplitude of the detector output current at each sampling time) on the second axis, and number of samples on the third axis.

4. The samples are plotted to produce a three-dimensional image or "landscape," wherein individual detector events appear as peaks. A well-defined set of peaks corresponds to a plurality of full-capture events, that is, detector interactions with incoming particles having approximately the same energy. The maxima of a series of peaks form a "ridge" or "edge" in the three-dimensional image. Each set of peaks represents detector interactions with incoming particles of different energies. Randomly-dispersed peaks, however, represent Compton events, and can be distinguished from full-capture events using image enhancement techniques.

5. A curve is fitted to each ridge and the area under each curve integrated to determine the energy of the full-capture events that produced those peaks.

Referring now to FIG. 2, there is shown a schematic view of an apparatus according to a preferred embodiment of the present invention. Apparatus 12 includes a radiation detector 20, such as a sodium iodide and photomultiplier tube (Na(I)/PMT) detector, that produces an output current pulse in response to a radiation event within the detector. Detector 20 directly interfaces a non-integrating amplifier 22. Amplifier 22 converts a current pulse 24 from detector 20 into a voltage pulse 26 and limits the signal to a range of frequencies using a bandwidth filter.

Output 26 of amplifier 22 is fed to two distinct, electrically parallel circuits. The first circuit includes a buffer amplifier 30 and a flash analog-to-digital (A/D) converter 32. Buffer amplifier 30 amplifies output 26 to produce an output signal 34. Amplifier 30 is preferably a fixed gain amplifier that provides adequate driving capacity to the input of converter 32. Alternatively, amplifier 30 may be a variable gain stage controlled by a digital signal processor 80. A/D converter 32 performs two functions: it samples output 34 of amplifier 30

(representing output 24 of detector 20) at a very high sampling rate, regardless of whether or not an event is occurring in detector 20, and converts the samples into corresponding digital values.

The sampling rate employed by A/D converter 32 is chosen based on the fundamental frequency and duration of the waveform of the event pulses to be detected, the rate at which events are occurring in the detector, the period of time over which detector events are to be sampled, the particular Compton elimination algorithms being used, and the desired overall resolution of apparatus 12. Higher sampling rates produce discernible peaks in the output of converter 32 in less time. The sampling rate for converter 32 is preferably set high enough so that a sufficiently large number of samples per event can be taken to obtaining an accurate digital representation of each event. For applications at low to moderate count rates (that is, the rate of occurrence of events in detector 20), the sampling rate meets the Nyquist frequency criteria for the event waveform and preferably exceeds it. At extremely high count rates, sampling may be performed below the Nyquist frequency to reduce the incoming data rate to digital signal processor 80.

A nominal sampling rate for A/D converter 32 may be determined empirically by sampling a pulse (or several pulses) at a very high rate, taking a Fourier transform of the data, and finding the highest frequency component. The sampling rate is preferably at least approximately twice the highest frequency component. Depending on the particular choice of detector and the types of events to be detected, the sampling rate of converter 32 could range from $10^6$ samples/sec to $10^9$ samples/sec.

A/D converter 32 constantly samples the output of detector 20 and converts the samples to a stream of digital values. A/D converter 32 has an output 36, consisting of a stream of digital values representing the amplitude of analog signal 34 at each sampling time. Output 36 contains values representing events (Compton events and full-capture events) and non-events (noise). Output 36 serves as an input to a two-function discriminator 40.

Since A/D converter 32 is a free-running device operating at a sampling rate on the order of $10^6$ samples/second or higher, the data stream (output 36) must be filtered for real data values (events) and no-data values or noise (non-events). The second circuit receiving output 26 of amplifier 22 includes a comparator 50, a track and hold (T/H) amplifier 52, an A/D converter 54, an digital-to-analog (D/A) converter 56, a sawtooth generator 58, and a clock 60. Generator 58 produces a sawtooth waveform signal 62 having a period 64. Signal 62 is input to T/H amplifier 52. Clock 60 produces a timing signal 66 having a period 68, serving as an input to discriminator 40 and A/D converters 32, 54. Comparator 50 has an output signal 74, which serves as an input to T/H amplifier 52. Amplifier 52 produces an output 76. These components together form a trigger circuit whose function is to compare amplified detector output 26 with a threshold value 70 provided by digital signal processor 80 and implemented by D/A converter 56.

Threshold 70 is set to a voltage established by output 26 of amplifier 22 to enable the data collection and analysis portions of apparatus 12. The value of threshold 70 therefore depends on the type of data being detected and is set according to the particular characteristics of the incoming data pulses. Ideally, threshold 70 is low enough to trigger data collection at or near the beginning of an event, yet high enough to prevent at least some non-event data such as noise from being accepted and processed as though it represented events. Comparator 50 generates a trigger signal 90 when threshold 70 is exceeded, causing T/H amplifier 52 to freeze its output 76 at the then-existing voltage value of sawtooth waveform 62. Output 76 is then converted by A/D converter 54 to a digital value representative of the time between the last main clock edge (generated by clock 60) and the time when output 26 of amplifier 22 exceeded threshold 70. Period 64 of sawtooth waveform 62 and period 68 of timing signal 66 are preferably the same, permitting accurate timing information to be generated and used as "trigger time."

When output 26 exceeds threshold 70, trigger signal 90 signals the beginning of a possible detector event to group discriminator portion 96 of discriminator 40. Output 36 of A/D converter 32 (sample amplitude, representing the output of detector 20) and output 78 of A/D converter 54 (sample time, as measured from the trigger time) are separately fed to discriminator 40 which is preferably a programmable gate array. Discriminator 40 processes the incoming data on a sample-by-sample basis to identify event samples and non-event samples (noise). Discriminator 40 also processes the data substantially as described in commonly-assigned patent application Ser. No. 07/014,916, filed Feb. 8, 1993, ("Method and Apparatus For Data Sampling"), the disclosure of which is incorporated herein by reference.

Discriminator 40 includes a FIFO (first-in-first-out) memory director/controller 92, a word discriminator function 94 and a group discriminator function 96, as indicated schematically in FIG. 2. Discriminator 40 has an output 98. Output 98 is fed to an array of buffers, preferably FIFO buffers 100, 102, then to digital signal processor 80. FIFO memory controller 92 communicates with signal processor 80 via a two-way link 106. Signal processor 80 may be any device that is capable of storing and processing the amount of data produced during operation of detector 20, such as an AD21020 floating point digital signal processor produced by Analog Devices, Inc. of Norwood, Mass.

As noted above, threshold 70 is preferably set at a level that is low enough to trigger collection of substantially all event data. Therefore, some of the samples collected by discriminator 40 may represent non-event data such as noise spikes. Discriminator 40 processes the samples to distinguish event data (full-capture events and Compton events) from non-event data.

Word discriminator 94 compares, in sequence, the amplitude of each sample in output 36 to a preselected threshold value $V_{th}$. $V_{th}$ is preferably at least approximately equal to threshold 70, but may be set at a higher value if desired to filter out at least some non-event data. Samples having an amplitude greater than or equal to $V_{th}$ are identified as being "potential event" samples; samples with a lesser amplitude are identified as "non-event" samples. The samples continue in their original sequence to group discriminator 96.

Group discriminator 96 receives alternating groups of potential event samples, having amplitudes greater than or equal to $V_{th}$, and groups of non-event samples, having amplitudes less than $V_{th}$, arranged according to their original sampling sequence. Thus, the non-event samples serve as separators between groups of potential event samples.

The interaction of an incoming radioactive particle with detector 20 is not instantaneous, but takes place over a period of time that depends on the type of particle and its energy. Noise spikes, in contrast, are typically shorter in duration. Thus, detector events generate at least a minimum number $N_{min}$ of contiguous samples, where $N_{min}$ is selected depending on the types of events being detected, their normal duration and the sampling rate of A/D converter 30. $N_{min}$ is preferably set low enough to allow collection of substantially all event data, but high enough to filter out substantially all non-event data.

Group discriminator 96 identifies event samples by their belonging to a sequence of at least a preselected minimum number $N_{min}$ of contiguous potential event samples. If a group of potential event samples contains at least $N_{min}$ samples, the entire group exits group discriminator 96 through an output 98. If the group contains fewer than $N_{min}$ potential event samples, the entire group is treated as noise and disregarded. As a result, output 98 from discriminator 40 carries a stream of samples occurring in sequence and representing only detected events.

The identified event samples are transferred via output 98 to an empty FIFO storage area, one of two or more such devices as indicated by FIFO areas 100, 102. Each of areas 100, 102 is preferably large enough to sequentially store all of the samples representing one event, retaining those samples for a period long enough to transfer the samples to signal processor 80. Thus, a series of event samples representing an event A is stored in area 100. Similarly, a series of event samples representing next event B is stored in area 102. A greater number of FIFO storage areas could be used as dictated by the actual occurrence rate of events and the speed of data processing by discriminator 40 and signal processor 80. With this type of storage, identified event sample groups are transferred from discriminator 40 into a buffer area (100 or 102) at a preselected rate, preferably equal to the sampling rate of A/D converter 32. This permits the sampling and discrimination processes of apparatus 12 to function at normal operating speed without delay. Event sample groups are then sent to signal processor 80 for storage and further analysis.

FIFO director/controller function 92 insures that all the samples from one detector pulse are inserted into the same FIFO memory along with the trigger time for that pulse. This is indicated schematically within FIFO 100 by samples 1 through M of a particular detector output pulse with "trigger time M." Similarly, the trigger time and samples of a second detector pulse are inserted into a successive FIFO area such as indicated by area 102 if signal processor 80 has not completed the process of transferring the samples from FIFO 100 to its own memory via output 104 before a next detector event occurs (indicated by "trigger time N" and samples 1 through N in FIFO 102). When its data have been transferred to processor 80, any FIFO area is ready for re-use as needed.

In use, radiation detector 20 is placed in an area of interest. Detector output 24 is amplified, and amplified signal 26 is sent to buffer 30. A/D converter 32 continuously samples analog output 34 of buffer amplifier 30 at a frequency in the approximate range of $10^6$–$10^9$ samples/sec. Output 36 of converter 32 is in the form of a sequential stream of discrete digital values representing the amplitude of analog waveform 34 at each sampling time. Output 36 enters discriminator 40, where word discriminator 94 and group discriminator 96 select for further processing those values which are greater than or equal to a predetermined threshold value, and which occur in a contiguous sequence of at least a minimum number of samples. The groups of digital values emerging from discriminator 40 pass to FIFO buffers 100, 102, then to signal processor 80 for storage and analysis.

Referring now to FIG. 3, there is shown a graphical view of a series of waveform samples obtained with apparatus 12. For clarity, only two representative time slices 120, 122 are shown, each containing samples 124, 126, respectively, taken by A/D converter 32 from many detector events.

When a series of radiation events is captured by radiation detector 20 as current pulses, each event being sampled at the same rate, the data samples are digitized and saved in signal processor 80 as they are received, in a three-dimensional matrix with time (measured from the trigger condition of the pulse) on one axis, the amplitude of the pulse current on the second axis, and the number of occurrences of time-amplitude samples on the third axis. Each point in the time-amplitude plane is actually a memory location in processor 80 that is dimensioned to handle the anticipated number of samples that may occur. For example, an unsigned 16-bit integer would permit as many as 65,535 samples to be accumulated in the third dimension of any one matrix element. As more events occur in detector 20, the third axis builds as individual time-amplitude points recur.

Radiation events do not occur synchronously in time. Therefore, the data points collected on one event pulse will not necessarily coincide with those collected for other pulses, even if the pulses have approximately the same shape. When the data points from multiple events of the same energy are overlaid on one another, the total collection of time-amplitude samples in the matrix produces a three-dimensional image or "landscape," with peaks corresponding to the individual detector events (FIG. 4). During operation of detector 20, full-capture events occur repeatedly at specific energies while Compton events occur at random energies. Therefore, full-capture events appear in the image as sets of well-defined, clustered peaks such as a set 130, consisting of individual peaks 130a, 130b, 130c, 130d, and so forth. The balance of the landscape contains randomly-dispersed peaks from Compton events, such as peaks 132, 134, 136. The Compton events can be removed by image enhancement techniques, revealing only peaks such as peaks 130 corresponding to repeated full-capture events. Peaks 130 have maxima 142a, 142b, and so forth, forming a "ridge" or "edge" in the three-dimensional image. A dotted line 144 represents the best curve fit along maxima 142. The area under curve 144 is proportional to the energy of the individual detector events that produced peaks 130.

Apparatus 10 may be calibrated using standard reference sources. Detector 20 receives incoming radiation from a standard source having a known energy spectrum, and the data are collected and processed as described above. The peaks in the three-dimensional image that represent full-capture events are identified, and the areas under the peaks are computed. These areas are correlated with the known energy spectrum of the source to provide calibration data for apparatus 12.

Curve 144 represents the average energy of a plurality of full-capture events represented by individual peaks 130a, 130b, and so forth. Therefore, the area under curve 144 provides a more accurate determination of the energy than the data from a single pulse interacting with detector 20. Radiation sources typically produce particles with a spectrum of energies, which would be represented in the three-dimensional image by a series of different curves such as curve 144. The energy spectrum of the incoming particles can be found by computing the area under each such curve, without determining the energy of any of the individual detector pulses whose digitized samples provided the energy information. This method is especially useful for analyzing full-capture events that are obscured by higher-energy Compton events. No other single-detector method of distinguishing Compton events from full-capture events is known.

Distinguishing background data (Compton events and noise) from full-capture event data includes these steps:

1. Background reduction to produce an enhanced image. For example, an addressable array of background correction factors may be stored in signal processor 80. For any point in the image, the correction factor corresponding to that coordinate position is used to generate a corrected point. The background-reduced data are plotted to produce an enhanced image.

2. Convolution of the enhanced image to detect ridges formed by well-defined sets of peaks.

3. Quantification of the detected ridges. For each set of peaks, a curve is fitted to the ridge formed by the maxima of the peaks. The area under the curve is calculated to find the energy of the particular detector events that produces those peaks.

These basic techniques may be combined with data analysis methods in numerous ways, including but not limited to the following:

A. Linear background subtraction and ridge detection convolution.

1. The three-dimensional image resulting from a series of detector events is rendered in either gray-scale or color.

2. Background reduction is carried out using the linear background subtraction technique, wherein a uniform gray-scale or color value is subtracted from the samples forming the image.

3. Two-dimensional convolution is then used to search for "ridges" or "edges" in the image formed by the repetitive occurrence of same-energy events (represented by peaks 130 in FIG. 4).

4. For the peaks of interest, the best polynomial curve fit is found for the points detected by ridge detection convolution (line 144 in FIG. 4)).

5. The area under the curve is calculated by integrating the polynomial across the period from pulse start to pulse end.

B. Non-linear spline fitting. Background reduction is carried out using the non-linear spline fitting background subtraction technique, wherein a non-uniform, but smoothly varying background level is removed from the entire image. The resulting image is analyzed as in steps 3-5 of method A.

C. Contrast enhancement by histogram equalization. The distribution of gray-scale or color values is determined for the image as-is. Scaling coefficients are determined such that the distribution of gray-scale or color values can be equalized across the entire image. The equalized image is then the subject of ridge detection and curve fitting as described in steps 3-5 of method A.

D. Partial background reduction. Background reduction is carried out on a portion of the image bounded by discernible peak curves as follows:

1. Discernible peaks are located by linear background subtraction, non-linear spline fitting background subtraction, or contrast enhancement by histogram equalization. Alternatively, peak curves are located by simpler methods such as searching for only the highest numerical values on the sample axis, relying on pre-characterized and previously-stored Compton distribution images.

2. The stored Compton image is intensity scaled (either in gray levels or color values as appropriate) to the relative magnitude in the third dimension (number of samples) of the peak height and then subtracted from the acquired image to remove nominal Compton effects from the image. This process is repeated for each energy peak curve discerned beginning with the highest energy peak curve.

3. The resulting image is processed by one of methods A-C as described above.

E. Template comparison. The acquired image is compared to a template (or convolution of previously stored peak curve templates) to find the points of maximum correlation with the template. Regional contrast enhancement of the image is carried out at areas showing at least a particular minimum level of correlation. Edge detection and further data analysis proceed as in steps 3-5 of method A.

F. Detector-adaptive synthetic template generation.

1. Readily discernible peaks are located by linear background subtraction, non-linear spline fitting background subtraction or contrast enhancement by histogram equalization as described above.

2. A polynomial is fitted to the collection of points representing the peak.

3. The coefficients of the polynomial are scaled to generate templates corresponding to the anticipated curves of energies peculiar to selected isotopes such that the remaining field of the image can be searched for correlation to these known isotopic energies.

Other combinations of image-enhancement and data analysis techniques may be used without departing from the spirit of the present invention.

It will be apparent to those skilled in the art that many changes and substitutions can be made to the preferred embodiment herein described without departing from the spirit and scope of the present invention as defined by the appended claims.

What is claimed is:

1. An apparatus for distinguishing full-capture events from Compton scattering events, said apparatus for use with a radiation detector producing a time-varying output signal representing events and non-events, said events being the interactions of radiation with atoms in the detector, said apparatus comprising:

means in operative connection with said detector for sampling said output signal at a preselected rate, said sampling means producing a sequential stream of samples including event samples and non-event samples, said event samples including Compton event samples and full-capture event samples, said non-event samples not including Compton event samples or full-capture event samples;

means for converting each sample of said sequential stream of samples to a digital value to produce a sequential stream of digital values from said sequential stream of samples, each of said digital values having an amplitude;

means for identifying said event samples from said sequential stream of digital values, said identifying means in operative connection with said converting means for comparing said amplitudes of said digital values to a preselected threshold value, said event samples having an amplitude at least equal to said preselected threshold value and said non-event samples having an amplitude less than said threshold value; and means for analyzing said event samples to distinguish said full-capture event samples from said Compton event samples.

2. The apparatus as recited in claim 1, wherein each of said event samples occurs within a group containing at least a preselected number of sequential samples, each sample of said group having an amplitude at least equal to said preselected threshold value, and wherein said identifying means further comprises means for selecting samples that occur within a group containing at least said preselected number of sequential samples having an amplitude at least equal to said preselected threshold value from among samples having an amplitude at least equal to said preselected threshold value.

3. The apparatus as recited in claim 1, wherein said event samples occur within a group of sequential samples, each sample of said group having an amplitude at least equal to said preselected threshold value, said group having a preselected duration, and wherein said identifying means further comprises means for selecting samples having an amplitude at least equal to said preselected threshold value that occur within a group having said preselected duration from among samples having an amplitude at least equal to said preselected threshold value.

4. The apparatus as recited in claim 1, wherein said events have a Nyquist frequency associated therewith and wherein said sampling means further comprises:
means in operative connection with said detector for amplifying said output signal; and
means in operative connection with said amplifying means for sampling the amplified signal at a rate at least approximately equal to said Nyquist frequency.

5. The apparatus as recited in claim 1, wherein said identifying means further comprises:
means for comparing said amplitudes to a first preselected threshold value to identify potential event samples, said potential event samples having an amplitude at least equal to said first preselected threshold value and said non-event samples having an amplitude less than said first threshold value;
means for comparing said amplitudes of said potential event samples to a second preselected threshold value, said second threshold value being at least approximately equal to said first threshold value, wherein said event samples occur within a group containing at least a preselected number of sequential potential event samples, each sample of said group having an amplitude at least equal to said second threshold value; and
means for selecting samples that occur within a group containing at least said preselected number of sequential samples having an amplitude at least equal to said preselected threshold value from among said potential event samples having an amplitude at least equal to said second threshold value.

6. The apparatus as recited in claim 1, wherein said analyzing means further comprises:
means for storing said identified event samples in a three-dimensional array, each of said event samples having a coordinate position in said array;
means responsive to said storing means for plotting said stored event samples to produce a three-dimensional image;
means for identifying said full-capture events in said three-dimensional image; and
means for computing the energy of said full-capture events.

7. The apparatus as recited in claim 1, wherein said analyzing means further comprises:
means for storing said identified event samples in a three-dimensional array to produce an array of stored event samples, each of said stored event samples having a coordinate position in said array;
background reduction means having stored therein an addressable array of background factors, said background factors responsive to said coordinate positions of said stored event samples to generate background reduction factors corresponding to said coordinate positions;
means responsive to said storing means for combining said stored event samples and said background reduction factors to provide image-enhanced samples, said image-enhanced samples including Compton event samples and full-capture event samples;
means for selecting said full-capture event samples from said image-enhanced samples, said selecting means in operative connection with said combining means; and
means for computing the energy of said full-capture events.

8. A method for distinguishing full-capture events from Compton scattering events, said method for use with a radiation detector producing a time-varying output signal, said method comprising the steps of:
sampling said detector output at a preselected rate to produce a sequential stream of samples including event samples and non-event samples, said event samples including full-capture event samples and Compton event samples, said non-event samples not representing events;
converting each sample of said sequential stream of samples to a digital value to produce a sequential stream of digital values from said sequential stream of samples, each of said digital values having an amplitude;
identifying said event samples from said sequential stream of digital values, said amplitude of said event samples being at least equal to a preselected threshold value and said amplitude of said non-event samples being less than said threshold value; and
analyzing said event samples to distinguish said full-capture event samples from said Compton event samples.

9. The method as recited in claim 8, wherein said sampling step further comprises the steps of:
amplifying said output signal; and
sampling said output signal at a rate high enough so that a plurality of samples of said output signal are taken during each event.

10. The method as recited in claim 8, wherein said event samples occur within a group containing at least a preselected number of sequential samples, each sample of said group having an amplitude at least equal to said preselected threshold value, and wherein said identifying step further comprises the step of selecting samples that occur within a group containing at least said preselected number of sequential samples having an amplitude at least equal to said preselected threshold value from among samples having an amplitude at least equal to said preselected threshold value.

11. The method as recited in claim 8, wherein said event samples occur within a group of sequential samples, each sample of said group having an amplitude at least equal to said preselected threshold value, said group having a preselected duration, and wherein said identifying step further comprises the step of selecting samples having an amplitude at least equal to said preselected threshold value that occur within a group having said preselected duration from among samples having an amplitude at least equal to said preselected threshold value.

12. The method as recited in claim 8, further comprising the steps of:
  storing said event samples in a three-dimensional array to produce an array of stored event samples, each of said stored event samples having a coordinate position in said array;
  combining said stored event samples with background correction factors to produce background-reduced samples, said background correction factors being responsive to said coordinate positions of said stored event samples to generate background reduction factors corresponding to said coordinate positions;
  selecting said full-capture event samples from said background-reduced samples; and
  computing the energy of said full-capture events.

13. The method as recited in claim 8, further comprising the steps of:
  storing said event samples in a three-dimensional array to produce an array of stored event samples, each of said stored event samples having a coordinate position in said array;
  plotting said stored event samples to produce a three-dimensional image, said image having a background;
  enhancing said image by combining said stored event samples with background correction factors, said background correction factors being responsive to said coordinate positions of said stored event samples to generate background reduction factors corresponding to said coordinate positions;
  selecting said full-capture events from said enhanced image; and
  computing the energy of said full-capture events.

14. A method for distinguishing full-capture events from Compton scattering events, said method for use with a radiation detector producing a time-varying output signal, said method comprising the steps of:
  sampling said detector output at a preselected rate to produce a sequential stream of samples including event samples and non-event samples, said event samples including full-capture event samples and Compton event samples, said non-event samples not representing events;
  converting each sample to said sequential stream of samples to a digital value to produce a sequential stream of digitized samples, each of said digitized samples having an amplitude;
  comparing said amplitude of said digitized samples to a first preselected threshold value to identify potential event samples, said amplitude of said potential event samples being greater than or equal to said first threshold value and said amplitude of said non-event samples being less than said first threshold value;
  selecting samples that occur within a group having a preselected duration from among said potential event samples having an amplitude greater than or equal to a second preselected threshold value, said selected samples including full-capture event samples and Compton event samples; and
  analyzing said selected samples to distinguish said Compton events from said full-capture events.

15. The method as recited in claim 14, wherein said event samples occur within a group containing at least a preselected number of potential event samples, each sample of said group having an amplitude greater than or equal to a second preselected threshold value, and wherein said selecting step further comprises the step of selecting samples that occur within a group containing at least said preselected number of potential event samples from among said potential event samples having an amplitude at least equal to said second threshold value.

16. The method as recited in claim 14, wherein said events have a Nyquist frequency associated therewith and wherein said sampling step further comprises sampling said detector output at a rate at least approximately equal to said Nyquist frequency.

17. The method as recited in claim 14, wherein said events have a highest Fourier transform frequency and wherein said sampling step further comprises sampling said detector output at a rate at least approximately equal to twice said highest frequency.

18. The method as recited in claim 14, wherein said analyzing step further comprises the steps of:
  storing said selected samples in a three-dimensional array to produce an array of stored samples, each of said stored samples having a coordinate position in said array;
  combining said stored samples with background correction factors to produce background-reduced samples, said background correction factors being responsive to said coordinate positions of said stored samples to generate background reduction factors corresponding to said coordinate positions;
  selecting said full-capture event samples from said background-reduced samples; and
  computing the energy of said full-capture event samples.

19. The method as recited in claim 14, wherein said analyzing step further comprises the steps of:
  storing said selected samples in a three-dimensional array to produce an array of stored samples, each of said stored samples having a coordinate position in said array;
  plotting said stored samples to produce a three-dimensional image, said image having a background;
  combining said stored samples with background correction factors to produce an enhanced image, said background correction factors being responsive to said coordinate positions of said stored samples to generate background reduction factors corresponding to said coordinate positions;
  selecting said full-capture events from said enhanced image; and
  computing the energy of said full-capture events.

20. The method as recited in claim 14, wherein said analyzing step further comprises the steps of:
- storing said selected samples in a three-dimensional array to produce an array of stored samples, each of said stored samples having a coordinate position in said array;
- plotting said stored samples to produce a three-dimensional image, said image having a background;
- combining said stored samples with background correction factors to produce an enhanced image, said background correction factors being responsive to said coordinate positions of said stored samples to generate background reduction factors corresponding to said coordinate positions, said enhanced image representing full-capture events and Compton events;
- convoluting said image to identify said full-capture events; and
- computing the energy of said full-capture events.

* * * * *